US011636343B2

(12) United States Patent
Alistarh

(10) Patent No.: US 11,636,343 B2
(45) Date of Patent: Apr. 25, 2023

(54) SYSTEMS AND METHODS FOR NEURAL NETWORK PRUNING WITH ACCURACY PRESERVATION

(71) Applicant: Neuralmagic Inc., Somerville, MA (US)

(72) Inventor: Dan Alistarh, Meyrin (CH)

(73) Assignee: Neuralmagic Inc., Somerville, MA (US)

( * ) Notice: Subject to any disclaimer, the term of this patent is extended or adjusted under 35 U.S.C. 154(b) by 766 days.

(21) Appl. No.: 16/584,214

(22) Filed: Sep. 26, 2019

(65) Prior Publication Data

US 2020/0104717 A1 Apr. 2, 2020

Related U.S. Application Data

(60) Provisional application No. 62/739,505, filed on Oct. 1, 2018.

(51) Int. Cl.
*G06N 3/04* (2006.01)
*G06N 3/082* (2023.01)
(52) U.S. Cl.
CPC ............... *G06N 3/082* (2013.01); *G06N 3/04* (2013.01)
(58) Field of Classification Search
CPC ........ G06N 3/082; G06N 3/04; G06N 3/0445; G06N 3/0454; G06N 3/084
USPC .......................................................... 706/15
See application file for complete search history.

(56) References Cited

U.S. PATENT DOCUMENTS

| 5,577,166 A | 11/1996 | Mizuno |
| 9,558,156 B1 | 1/2017 | Bekas et al. |
| 9,811,775 B2 | 11/2017 | Krizhevsky et al. |
| 9,818,059 B1 | 11/2017 | Woo et al. |
| 10,157,045 B2 | 12/2018 | Venkataramani et al. |
| 10,223,333 B2 | 3/2019 | Chetlur et al. |
| 10,572,568 B2 | 2/2020 | Narayanamoorthy et al. |
| 10,685,082 B2 | 6/2020 | Bekas et al. |
| 10,719,323 B2 | 7/2020 | Baum et al. |

(Continued)

FOREIGN PATENT DOCUMENTS

| CN | 107832839 | 3/2018 |
| EP | 3 037 980 | 6/2016 |

(Continued)

OTHER PUBLICATIONS

Du et al., "Width Provably Matters in Optimization for Deep Linear Neural Networks", May 27, 2019, arXiv:1901.08572v3.

(Continued)

*Primary Examiner* — Charlotte M Baker
(74) *Attorney, Agent, or Firm* — Pearl Cohen Zedek Latzer Baratz LLP

(57) ABSTRACT

Training a neural network (NN) may include training a NN N, and for S, a version of N to be sparsified (e.g. a copy of N), removing NN elements from S to create a sparsified version of S, and training S using outputs from N (e.g. "distillation"). A boosting or reintroduction phase may follow sparsification: training a NN may include for a trained NN N and S, a sparsified version of N, re-introducing NN elements previously removed from S, and training S using outputs from N. The boosting phase need not use a NN sparsified by "distillation." Training and sparsification, or training and reintroduction, may be performed iteratively or over repetitions.

28 Claims, 4 Drawing Sheets

(56) References Cited

U.S. PATENT DOCUMENTS

| | | | |
|---|---|---|---|
| 10,832,139 B2* | 11/2020 | Yan | G06N 3/082 |
| 2010/0076915 A1 | 3/2010 | Xu et al. | |
| 2011/0119467 A1 | 5/2011 | Cadambi et al. | |
| 2013/0138589 A1 | 5/2013 | Yu et al. | |
| 2015/0127327 A1* | 5/2015 | Bacchiani | G10L 15/26 |
| | | | 704/202 |
| 2016/0224465 A1 | 8/2016 | Morad et al. | |
| 2016/0239706 A1 | 8/2016 | Dijkman et al. | |
| 2016/0328643 A1 | 11/2016 | Liu et al. | |
| 2016/0358070 A1 | 12/2016 | Brothers et al. | |
| 2016/0379109 A1 | 12/2016 | Chung et al. | |
| 2017/0103313 A1 | 4/2017 | Ross et al. | |
| 2017/0103317 A1 | 4/2017 | Young | |
| 2017/0132496 A1 | 5/2017 | Shoaib et al. | |
| 2017/0169567 A1 | 6/2017 | Chefd'Hotel et al. | |
| 2017/0193361 A1 | 7/2017 | Chilimbi et al. | |
| 2017/0200094 A1 | 7/2017 | Bruestle et al. | |
| 2017/0220524 A1 | 8/2017 | Herrero Abellanas et al. | |
| 2017/0316311 A1 | 11/2017 | Pilly et al. | |
| 2017/0316312 A1 | 11/2017 | Goyal et al. | |
| 2017/0032487 A1 | 12/2017 | Ashari et al. | |
| 2017/0372202 A1 | 12/2017 | Ginsburg et al. | |
| 2018/0046900 A1 | 2/2018 | Dally et al. | |
| 2018/0096226 A1 | 4/2018 | Aliabadi et al. | |
| 2018/0173571 A1 | 6/2018 | Huang et al. | |
| 2018/0253402 A1 | 9/2018 | Redfern et al. | |
| 2018/0315159 A1 | 11/2018 | Ould-Ahmed-Vall et al. | |
| 2018/0322390 A1 | 11/2018 | Das et al. | |
| 2018/0336468 A1 | 11/2018 | Kadav et al. | |
| 2019/0042250 A1 | 2/2019 | Anders et al. | |
| 2019/0042542 A1 | 2/2019 | Narayanamoorthy et al. | |
| 2019/0056916 A1 | 2/2019 | Varma et al. | |
| 2019/0138902 A1 | 5/2019 | Matveev et al. | |
| 2019/0156206 A1 | 5/2019 | Graham et al. | |
| 2019/0156214 A1 | 5/2019 | Matveev et al. | |
| 2019/0156215 A1 | 5/2019 | Matveev et al. | |
| 2019/0179818 A1 | 6/2019 | Lee | |
| 2019/0205759 A1* | 7/2019 | Zhang | G06N 3/10 |
| 2019/0212982 A1 | 7/2019 | Yoda et al. | |
| 2019/0303743 A1 | 10/2019 | Venkataramani et al. | |
| 2019/0354894 A1 | 11/2019 | Lazovich et al. | |
| 2019/0370071 A1 | 12/2019 | Matveev et al. | |
| 2019/0370644 A1 | 12/2019 | Kenney et al. | |
| 2020/0034710 A1 | 1/2020 | Sidhu et al. | |
| 2020/0097826 A1 | 3/2020 | Du et al. | |
| 2020/0104717 A1 | 4/2020 | Alistarh | |
| 2020/0160181 A1 | 5/2020 | Zlateski et al. | |
| 2020/0160182 A1 | 5/2020 | Matveev et al. | |
| 2020/0193274 A1 | 6/2020 | Darvish Rouhani et al. | |
| 2020/0218978 A1 | 7/2020 | Kopinsky | |
| 2020/0320400 A1* | 10/2020 | David | G06N 3/086 |
| 2020/0342301 A1 | 10/2020 | Miao et al. | |

FOREIGN PATENT DOCUMENTS

| | | |
|---|---|---|
| WO | WO 2017/049496 | 3/2017 |
| WO | WO 2018/053835 | 3/2018 |
| WO | WO 2019/090325 A1 | 5/2019 |
| WO | WO 2020/046859 | 3/2020 |
| WO | WO-2020/047823 | 3/2020 |
| WO | WO 2020/072274 | 4/2020 |

OTHER PUBLICATIONS

Gale et al., "The State of Sparsity in Deep Neural Networks", Feb. 25, 2019, arXiv:1902.09574v1.

Han et al., "Learning both Weights and Connections for Efficient Neural Networks", 2015, Advances in Neural Information Processing Systems, vol. 28.

Hinton et al., "Distilling the Knowledge in a Neural Network", Mar. 9, 2015, arXiv:1503.02531v1.

Lecun et al., "Optimal brain damage", Advances in neural information processing systems, 1990, pp. 598-605.

Mishra et al., "Apprentice: Using Knowledge Distillation Techniques to Improve Low-Precision Network Accuracy", Nov. 15, 2017, arXiv:1711.05852v1.

Rusu et al., "Progressive Neural Networks", Sep. 7, 2016, arXiv:1606.04671v3.

Alwani et al., "Fused-layer CNN accelerators." 49th Annual IEEE/ACM International Symposium on Microarchitecture (MICRO), 2016, pp. 1-12.

Despande, A beginner's guide to understanding convolutional neural networks, Jul. 20, 2016, retrieved from https://adeshpande3.github.io/A-Beginner%27s-guide-to-understanding-convolutional-neural-networks/ entire document.

Lavin et al., "Fast Algorithms for Convolutional Neural Networks", Nov. 10, 2015, arXiv:1509.09308v2.

Budden et al., "Deep tensor convolution on multicores", In Proceedings of the 34th International Conference on Machine Learning, 2017, vol. 70, pp. 615-624.

Chen, Xuhao, "Escoin: Efficient Sparse Convolutional Network Inference on GPUs." From Jul. 2017 "Conference '17", Apr. 3, 2019 (Apr. 3, 2019) Retrieved on Jan. 17, 2020 (Jan. 17, 2020)from <https://arxiv .org/pdf/1802.10280.pdf> entire document.

Georganas et al., "Anatomy Of High-Performance Deep Learning Convolutions On SIMD Architectures." In: SC18: International Conference for High Performance Computing, Networking, Storage and Analysis. Aug. 20, 2018 (Aug. 20, 2018) Retrieved on Jan. 17, 2020 (Jan. 17, 2020) from <https://arxIv.org/pdf/1808.05567 .pdf> entire document.

Kim et al., "Designing Vector-Friendly Compact BLAS and LAPACK Kernels", SC17, Nov. 12-17, 2017, Denver, CO, USA.

Lascorz et al., "Bit-Tactical: Exploiting Ineffectual Computations in Convolutional Neural Networks: Which, Why, and How", Mar. 9, 2018, arXiv:1803.03688v1.

Liu et al., "Sparse convolutional neural networks." In: Proceedings of the IEEE Conference on Computer Vision and Pattern Recognition. Jun. 12, 2015 (Jun. 12, 2015) Retrieved on Jan. 17, 2020 (Jan. 17, 2020) from <http://openaccess.thecvf.com/content_cvpr_2015/papers/Liu_Sparse_Convolutional_Neural_2015_CVPR_paper.pdf> entire document.

Papyan et al., "Convolutional neural networks analyzed via convolutional sparse coding." In: The Journal of Machine Learning Research. Jul. 17, 2017 (Jul. 17, 2017) Retrieved on Feb. 20, 2020 from <http://www.jmlr.org/papers/volume18/16-505/16-505.pdf> entire document.

Scardapane et al. "Group sparse regularization for deep neural networks.", In: Neurocomputing. Jul. 2, 2016 (Jul. 2, 2016) Retrieved on Nov. 16, 2019 (Nov. 16, 2019) from <https://arxiv.org/pdf/1607.00485.pdf> entire document.

Wozniak et al., "GiMMiK—Generating bespoke matrix multiplication kernels for accelerators: Application to high-order Computational Fluid Dynamics", Computer Physics Communications, vol. 202, 2016, pp. 12-22.

Smith et al., "SPLATT: Efficient and parallel sparse tensor-matrix multiplication", 2015 IEEE International Parallel and Distributed Processing Symposium, IEEE, 2015, (Year: 2015).

Zhangxiaowen Gong et al. "SparseTrain: Leveraging Dynamic Sparsity in Training DNNs on General-Purpose SIMD Processors"; 2019.

Yu, Dong, Li Deng, and Frank Seide. "The deep tensor neural network with applications to large vocabulary speech recognition". IEEE Transactions on Audio Speech, and Language Processing 21.2 (2012): 388-396. (Year: 2012).

Kurtz, Mark, et al. "Inducing and Exploiting Activation Sparsity for Fast Neural Network Inference." Proceedings of the International Conference on Machine Learning. 2020.

Robert Lim; "Methods for Accelerating Machine Learning in High Performance Computing"; University of Oregon—AREA—Jan. 2019.

Zhizhou Li et al.; "A CPU-based Algorithm for Traffic Optimization Based on Sparse Convolutional Neural Networks"; 2017 IEEE 30th Canadian Conference on Electrical and Computer (CCECE).

Baoyuan Liu et al.; "Sparse Convolutional Neural Networks"; CVPR 2015—Computer Vision Foundation—IEEE.

(56) References Cited

OTHER PUBLICATIONS

Hesham Mostafa et al.; "Parameter Efficient Training of Deep Convolutional Neural Networks by Dynamic Sparse Reparameterization"; Proceedings of the 36 th International Conference on Machine Learning, Long Beach, California, PMLR 97, 2019.
Israt Nisa et al.; "Sampled Dense Matrix Multiplication for High-Performance Machine Learning"; 2018 IEEE 25th International Conference on High Performance Computing (Hi PC).
Yuster, Raphael, and Uri Zwick. "Fast sparse matrix multiplication." ACM Transactions On Algorithms (TALG) 1.1 (2005): 2-13.
Park, Jongsoo, et al. "Faster cnns with direct sparse convolutions and guided pruning." arXiv preprint arXiv:1608.01409 (2016).
Paixao, Crysttian A., and Flávio Codeço Coelho. Matrix compression methods. No. e1049. PeerJ PrePrints, 2015.
McMichael, Justin, https://www.kinematicsoup.com/news/2016/9/6/data-compression-bit-packing-101; Sep. 6, 2016.

* cited by examiner

SYSTEMS AND METHODS FOR NEURAL NETWORK PRUNING WITH ACCURACY PRESERVATION

RELATED APPLICATION DATA

This application claims benefit from U.S. provisional patent application 62/739,505 filed on Oct. 1, 2018 and entitled "SYSTEM AND METHOD FOR NEURAL NETWORK PRUNING WITH ACCURACY PRESERVATION BY KNOWLEDGE DISTILLATION AND WEIGHT REINTRODUCTION", incorporated herein by reference in its entirety.

FIELD OF THE INVENTION

The invention relates generally to neural network training, specifically to creating sparse neural networks with improved accuracy.

BACKGROUND

Neural networks (NN) or connectionist systems are computing systems inspired by biological computing systems, but operating using manufactured digital computing technology. NNs are made up of computing units typically called neurons (which are artificial neurons, as opposed to biological neurons) communicating with each other via connections, links or edges. In common NN implementations, the signal at the link between artificial neurons may be for example a real number, and the output of each neuron may be computed by a function of the (typically weighted) sum of its inputs, such as the ReLU rectifier function. NN links or edges typically have a weight that adjusts as learning proceeds. The weight increases or decreases the strength of the signal at a connection. Typically, NN neurons are divided or arranged into layers, where different layers may perform different kinds of transformations on their inputs and may have different patterns of connections with other layers. Typically, a higher or upper layer, or a layer "above" another layer, is a layer more towards the output layer, and a lower layer, preceding layer, or a layer "below" another layer, is a layer towards the input layer.

Such systems may learn to perform tasks by considering example input data, generally without being programmed with any task-specific rules, being presented with the correct output for the data, and self-correcting. During learning the NN may execute a forward-backward pass where in the forward pass the NN is presented with an input and produces an output, and in the backward pass (backpropagation) the NN is presented with the correct output, generates an error (e.g., a "loss"), and generates update gradients which are used to alter the weights at the links or edges.

Learning or training may be organized in batches and epochs. A batch may be a set of multiple training data presented to a NN which results in a number of outputs. The NN weights may be modified after an entire batch is run. A loss may be generated for each batch. An epoch may be a set of batches representing the entire training set; thus an epoch may represent a number of forward/backward passes, each resulting in weight adjustment. There may be multiple losses per epoch, one for each batch. For example, if there are 1,000 sets of training data, divided into 100 batches of 10 data sets each, the training using all 100 batches may make up one epoch. A NN may be trained in multiple epochs, each epoch using the same training data as the last. Other methods of organizing training may be used.

Various types of NNs exist. For example, a convolutional neural network (CNN) is a deep, feed-forward network, which includes one or more convolutional layers, fully connected layers, and pooling layers. CNNs are particularly useful for visual and speech applications. Other NNs include for example long short-term memory (LSTM) networks.

A NN may be modelled as an abstract mathematical object, such as a function. Thus the NN may be "virtual" and no actual physical neurons, links, etc. may exist, these existing rather as data executed by processors. A NN may be translated physically to a CPU (e.g. a traditional architecture computer, such as a PC) or graphics processing units (GPUs, specialized processors) as for example a sequence of matrix operations where entries in the matrix represent neurons and/or links (e.g. artificial neurons connected by edges or links) or other NN parameters and matrix functions represent functions of the NN. GPUs and similar massively parallel hardware devices may be used to provide the large amounts of compute typically needed to train and/or perform inference (e.g. operate at run-time) in NNs. GPUs can have thousands of relatively weak compute cores, small caches, but high memory bandwidth. This contrasts with traditional CPU architectures, that have few powerful cores, very large caches, low memory bandwidth, and have each core executing different instructions at different times in an asynchronous fashion.

GPUs may operate using a "lock-step" execution strategy, in which all cores execute identical computation steps at the same time. This is well suited to large matrix or tensor operations where the operands are dense, that is, have few or no non-zero values.

In both GPU and CPU architectures, the neural network's weights and inputs may be represented as matrices, and the computation of the network (e.g. the inference or run-time operation) includes a sequence of multiplications of these matrices.

Properties of these matrices can enable faster matrix multiplication algorithms. One such property is sparsity—a matrix is said to be sparse if it contains a lot of entries that are zero (0). While the input matrix of data to be processed at inference or run time (and the sparsity of the input matrix) is usually out of the network designer's control, the weights of the neural network can be made sparse using a technique called pruning or sparsification. This sparsity can be exploited on more complex computing architectures, such as CPUs, to reduce the amount of computation, and therefore reduce running times. GPUs may also benefit from sparsification.

Among the many weights or parameters in a neural network, a fair fraction are redundant and do not contribute much to the network's output. One may, for example, rank the elements (e.g. links, neurons) in the network according to how much they contribute, and then remove the low-ranking elements from the network by setting their matrix entries to 0. A benefit of sparsity, even when some accuracy is lost, is that the resulting network could be smaller and could have a smaller memory footprint with a proper sparse matrix representation. Computation during the matrix multiplication may be reduced if matrix entries are zero, or if multiplying by the entries of the weight matrix that are zero is avoided.

The current approaches for pruning or sparsifying the weights in neural networks follow a standard structure. The process may start with a trained (e.g. fully-trained), dense variant of the network, and then proceeds to gradually remove weights from the model, by zeroing them out. (At the implementation level, these weights may be masked so that they become irrelevant both in the forward and backward passes of the optimization algorithm through the network.)

SUMMARY

Training a neural network (NN) may include training a NN N, and for S, a version of N to be sparsified (e.g. a copy of N), removing NN elements from S to create a sparsified version of S, and training S using outputs from N (e.g. "distillation"). A boosting or reintroduction phase may follow sparsification: training a NN may include for a trained NN N and S, a sparsified version of N, re-introducing NN elements previously removed from S, and training S using outputs from N. The boosting phase need not use a NN sparsified by "distillation." Training and sparsification, or training and reintroduction, may be performed iteratively or over repetitions.

Embodiments may use a novel method of "self-distillation" from the same model, e.g. from a dense version of a model to a sparse version, in order to prune and/or reintroduce pruned weights while increasing accuracy of the pruned or sparsified model.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
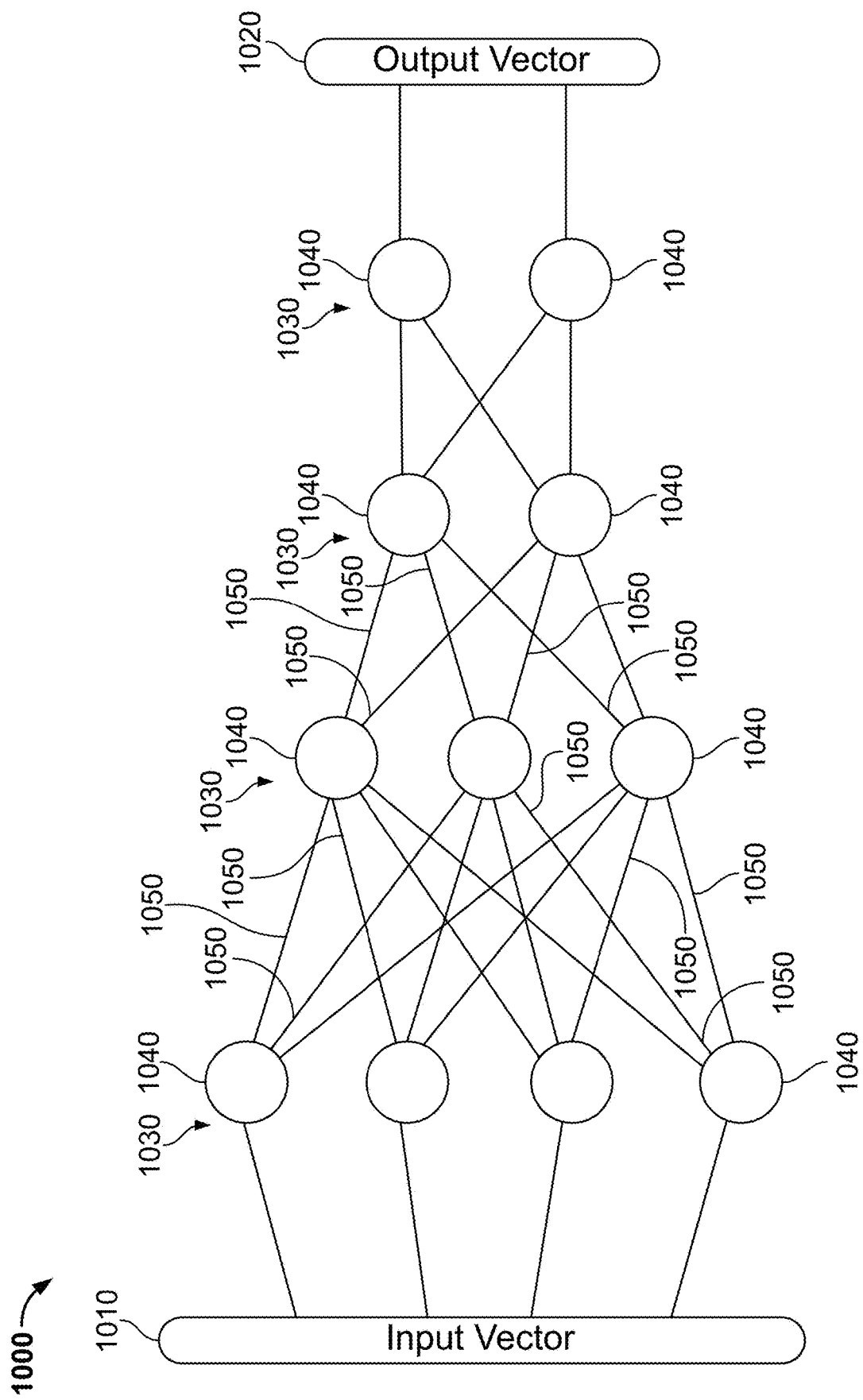
FIG. 1 is a block diagram of a neural network according to an embodiment of the present invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

A NN may be trained, and the trained NN may be pruned or sparsified (e.g. elements such as neurons, weights such as link weights and/or links may be removed). The trained NN may be sparsified by creating a copy of the trained NN, e.g. a version to be sparsified. During sparsification, the trained and non-sparse, or original, NN may be used to train the sparsified NN (which may be a copy of the trained NN, modified by sparsification), using information from the trained and non-sparse NN. During sparsification, NN elements may be removed from the copy NN, and training on the copy may be conducted using outputs from the original NN. Outputs from the original NN may include for example categorization or output of a softmax layer, or other suitable outputs. This may be performed over a series of iterations or repetitions: for example a copy of a trained NN may have a certain number or proportion of its weights removed, this sparsified NN may be trained using information from a layer or the output of the original NN, and this process may be repeated, increasing sparsification. The resulting sparsified NN may be "boosted" by adding back a certain number or amount of NN elements such as weights and after this re-introduction, training the boosted and sparsified NN using information or outputs from the original, dense NN. This boosting may be repeated over a series of iterations. Embodiments may work on CPUs, GPUs, or other computing devices.

Using the technique of pruning or sparsification neurons or other NN entities (e.g. links, weights) may be ranked in the NN according to for example their weights or the strength of their activations (e.g. signals passed on to other neurons in the NN), and then a fraction of low ranking elements may be removed from the network. For example, removal may be by setting all of the matrix entries corresponding to the entities or their weights to 0, or by setting an entry in a parallel mask data structure to zero. For example, the sets referred to in Table 1 of $Valid_L$ (weights in layer L which are not pruned and $Pruned_L$ (weights in a layer L that are pruned) may be represented by having for each link a mask entry, where an entry of 1 means the link is in $Valid_L$ and 0 means the link is in $Pruned_L$.

In some embodiments, a single link is removed without affecting the other links to/from the neurons attached to that link. In other embodiments, to remove a neuron, the links or weights to and from the neuron may be removed. The rank of a neuron may be based on a derivation of all weights to and/or from the neuron: for example, the sum of weights of links inputting to a neuron may be determined and used to rank or determine which neurons to remove. Other measures of a NN element when determining whether or not to remove may be used; for example weights may be normalized before processing, or the absolute value or magnitude or weights may be used. Other data or NN structures may be pruned or removed: for example a filter or a kernel representation may be pruned.

Marking a neural network structure as present on the one hand or pruned or removed on the other hand may be performed by using for example a data structure storing metadata relating to the NN. For example, a matrix or database may store, for each element, whether or not it has been pruned, and weight(s) associated with the element at the time of pruning. To prune a NN element, a marker such as a 0 (zero) may be placed in an entry associated with the neuron in metadata or a mask.

The process of removing weights from a neural network may be performed at the level of each layer, where the set of weights in each layer can be seen as a multi-dimensional tensor. Removing weights may be performed via a thresholding procedure, by which all weights below a certain value are zeroed out. Following the removal of the weights, the model may be re-trained for a limited set of training iterations in order to improve its accuracy, a process known as fine-tuning. Several methods are possible for choosing the threshold value under which all weights will be pruned at a step. Embodiments of the present invention may be independent of this choice of threshold, in the sense that they will work for all known thresholding techniques.

If pruning is done according to embodiments described herein, the resulting sparse network, where some of the weights are zero, can actually have a similar, the same or improved accuracy relative to the original network. An improvement over prior methods, even when some accuracy is lost, is that the resulting network may be smaller (e.g. have a smaller memory footprint) with a sparse matrix representation as described herein. Moreover, if the computations related to the zero elements are skipped or never performed, the overall computation for the network could be reduced significantly. These enhancements are applicable in some form to all computational platforms, such as CPUs and GPUs. Some embodiments of the invention may improve prior art pruning by using boosted distilled pruning, which may reduce the number of weights in a NN while preserving its accuracy or keeping its accuracy near to the non-pruned network on a given task. Prior art pruning of NN weights may only prune a limited fraction of the weights before adversely impacting or significantly impacting the accuracy of the network.

Embodiments may include a pruning phase, starting from a fully trained, dense variant of the NN, and may gradually remove weights until a set sparsity threshold (e.g. a percentage or number of removed NN elements such as neurons) is reached, followed by a weight reintroduction phase, in which some of the weights are gradually re-introduced into the pruned network in order to boost its accuracy. The resulting boosted distilled pruning method can remove significantly more weights from the network before impacting accuracy, or significantly impacting accuracy.

Embodiments may use one or a combination of two novel techniques, distilled pruning and boosting by weight reintroduction. A distilled pruning embodiment may leverage latent information stored in the dense (non-pruned, or original) variant or copy of the NN to improve the accuracy of the pruned network. For example, instead of directing the pruned network to only correctly classify the training examples or inputs, as is done in regular training, and in standard pruning techniques, distilled pruning may direct the pruned network to mimic the dense network for each training example. The pruned network may learn to mimic a dense version of itself.

An embodiment may leverage the fact that NNs may generate significantly more information about the input than is reflected in the output, e.g. in categorical class predictions. For instance, given a neural network used for image classification, when classifying an example or input (e.g. distinguishing whether an image represents the 'cat' or the 'dog' class) the NN in fact outputs a set of numbers, one per class, representing the likelihoods that the given image is classified to the corresponding class. The output of the network for a given sample is typically taken to be the class with the highest such likelihood. Embodiments of the present invention may leverage the significant additional information given by internal information—the likelihood numbers for each of the target classes—extracted from the fully-trained network, and use it to enhance the accuracy of the pruned network. For example, the inputs (e.g. logits) to a softmax layer in a NN may be used as internal NN information reflected in a NN output, used to boost accuracy of a pruned NN.

An embodiment may use an accuracy boosting by weight reintroduction technique, for example gradually or over a series of periods adding back a subset of the pruned weights to the pruned network, in order to improve its accuracy. A NN may be fully trained, then pruned, where the fully trained and pruned versions are maintained (e.g. a copy of the fully trained version is kept to be used to train the pruned version), and the fully trained version may be used to train the pruned network as weights are added back. The re-introduced weights may resume being optimized via backpropagation (e.g. the weights are re-introduced and once they are re-introduced they may again be optimized via backpropagation), giving the network additional capacity to improve its accuracy.

Weight reintroduction breaks with and improves upon prior art pruning techniques, which are typically one-way, in the sense that they only remove weights from the network, and never consider adding them back. Prior art approaches are typically one-shot: once weights have been pruned or zeroed out, they are never re-activated for the remainder of the process. A second feature of prior art approaches is that they use a standard training process in the fine-tuning phase. Embodiments may deviate from both these characteristics.

The structure of NNs used for classification tasks has such NNs typically producing, for each class (e.g. each possibly output for the NN, e.g. "cat", "truck" etc.) i, an output $z_i$, sometimes called a logit, which intuitively encodes the likelihood that a given example or input should be classified to class i. The logits may be input to a softmax layer to produce a final output for the NN. Here, i may cycle over all the K output classes. These logits $z_i$, for each class i, may be transformed into probabilities $q_i$ by comparing each $z_i$ to the other logits, in a separate layer, e.g. a softmax layer, for example via the following example formula (as with all formulas used herein, different formulas may be used):

$$q_i = \frac{\exp\left(\frac{z_i}{T}\right)}{\sum_j^K \exp\left(\frac{z_j}{T}\right)}$$

where the parameter T, called the temperature, controls how "sharp" the output probability distribution over classes should be, and $\exp(x)=e^x$ where $e^x$ is the exponential function based on the natural logarithm e.

In some prior art systems, a temperature as used in a "working" NN used to produce a useful output, where the output is to be used "per se", may be a number such as 2, producing a "spiky" output more clearly defining the most likely category. In the case of distilled learning embodiments as described herein, T may be set so distribution is smoother, and more of the inputs to softmax (e.g. more incorrect answers) are "visible" in the final output; for example T may be 5. Thus in some embodiments a teacher NN may be modified from its normal use by having the temperature T modified. Methods of producing a final output other than using softmax may be used, and other temperatures may be used.

In the basic case in which each example or input to a NN for training pertains to a single ground-truth class, the target ground-truth distribution $(d_i)_{i=1,\ldots,K}$ has value $d_j=1$ for the correct class j, and 0 for all other classes (where the ground-truth is the correct, or proper objective, answer or output for a specific input or example). The ground-truth may be, e.g. the expected final output from the NN based on an input ex (e.g. an image). The loss for a specific input or example ex to a NN may be the cross-entropy between the softmax-normalized outputs and the ground-truth distribution, in one example:

$$loss(ex) = \sum_{i=1}^{K} \log q_i(ex) d_i(ex)$$

Where q represents the final output for the NN, e.g. the softmax layer output, based on an input or example ex and d represents the ground-truth distribution. Thus loss(ex) is loss based on a final output of a NN based on input ex.

Figure 3:
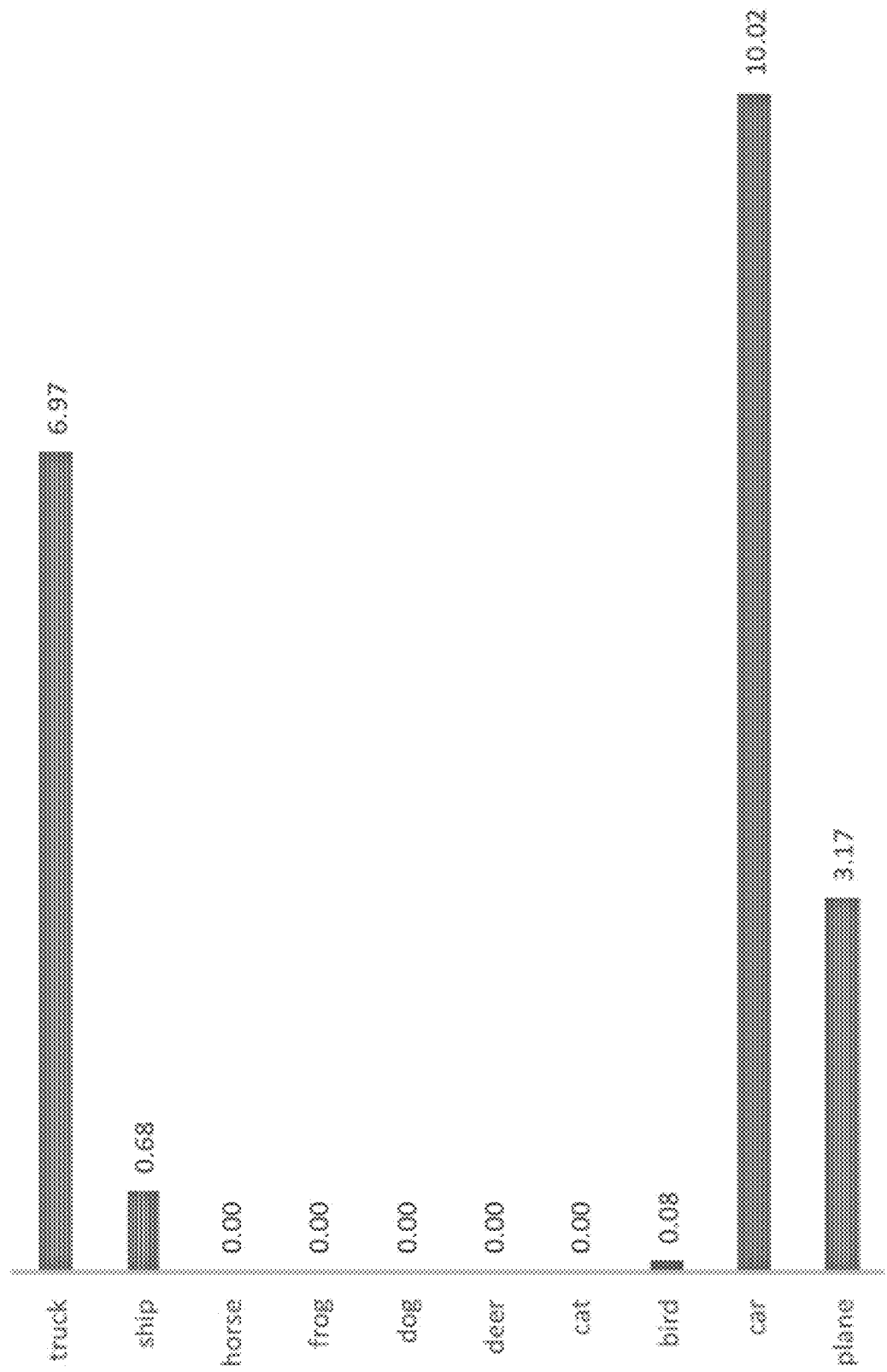
FIG. 3 depicts logit values for an example or input from the CIFAR-10 image classification dataset on a fully-trained convolutional neural network.

Cross-entropy loss is differentiable with respect to the logits $q_i$, and can therefore be used for gradient-based training of deep models. FIG. 3 depicts example logit values—e.g. inputs to a softmax layer—for an example from the CIFAR-10 image classification dataset on a fully-trained convolutional NN (other datasets may be used). The example input to the NN can be assigned to one of 10 classes for the particular example NN. The neural network produces as an internal value a value (e.g. logit) for the "likelihood" that the example should be assigned to each class. These values are mapped, for example to the interval [0, 1], via a softmax layer so that cross-entropy loss can be applied, and the maximum likelihood class is returned as the prediction for the example. Other ranges for output mapping may be used, and other methods of producing a final output may be used.

An embodiment may take as a start for example a large, accurate, but expensive to run, NN, and produce from this NN a smaller, more efficient NN. The first or former NN may be the teacher, and may be maintained as a copy, and the latter or output NN may be the student. The teacher NN has already been trained to full accuracy (by some standard of full accuracy), and an embodiment may exploit its structure to train the student to higher accuracy than we would be able to via direct (e.g. using the loss of the student NN only relative to the ground-truth labels) training.

A NN may be trained (e.g. fully trained to some standard), using known processes, e.g. by applying a data set across epochs and using forward propagation and backward propagation. This trained NN may be termed a teacher, and a copy may be made of this fully trained NN (e.g. by reproducing the data describing the NN) in order to create a pruned or sparsified student NN.

An embodiment may use a NN output, e.g. output of the softmax layer, of a non-sparse NN, to train the sparsified version of that NN. Typically, a NN is trained by applying a loss during backpropagation. Both the original, dense, trained NN (which may be termed N) and the version or copy of N (which may be termed S) which is sparsified (possibly over a series of steps or iterations) may be stored or maintained (e.g. in a memory or storage shown in FIG. 2) at the same time. NN elements (e.g. neurons, link weights, links, etc.) may be removed from S to create a sparsified version of S. The pruned or sparsified version of S may be trained using outputs from N (at least in part, possibly combined with other data) as opposed to the final output of N. An embodiment of the present invention may use knowledge distillation to train a sparse NN (e.g. the student) not using ground-truth (actual answer) cross-entropy loss (or not using such loss exclusively), but rather expressing the cross-entropy loss with respect to the output of the full, non-sparse (e.g. teacher) NN on that specific example, for example taken with a high temperature in the softmax function. For example, if $t_i(ex)$ is the teacher's output distribution on class i for example ex, and $q_i(ex)$ is the student's output distribution on class i for example ex, the resulting cross-entropy loss, called the distillation loss, would be, for example:

$$loss(ex) = \sum_{i=1}^{K} \log q_i(ex) t_i(ex)$$

In practice, an embodiment may balance the ground-truth loss and the distillation loss, yielding a loss of the form, for example:

$$loss(ex) = w_D \sum_{i=1}^{K} \log q_i(ex) t_i(ex) + w_G \sum_{i=1}^{K} \log q_i(ex) d_i(ex)$$

where $t_i$ represents a teacher's output, $d_i$ represents ground truth, $q_i(ex)$ is the student's output, and $w_D$ and $w_G$ are scalar weights assigned to the two losses, summing to 1. These weights may be for example close to or equal to 1 for $w_D$ (meaning the teacher's output is mostly or all represented), ½ each, or other weight combinations. Such example calculations of loss may be used to train a sparsified NN, during sparsification, during reintroduction, or both. Thus, in one embodiment, distillation training of a student NN (when pruning and/or when re-introducing elements) may use a loss generated or calculated by, for an input ex, some combination of output from a teacher NN based on that input and/or the ground truth for that input and or the output from the student NN based on that input. Some embodiments may distil information from an accurate, fully-dense NN onto a NN that is a pruned version of itself. An embodiment may use boosted distilled pruning to reduce the number of link weights or other elements in a NN by a significant fraction, while preserving its accuracy or creating a lighter NN with accuracy within a certain percentage. Some embodiments may use distilled pruning and/or distilled boosting (where weights are added back).

In a distilled pruning phase, an embodiment may periodically (e.g. once per epoch, or another period of time) remove NN elements (e.g. neurons or weights) from the copy of the trained NN. This may be done for example by setting to zero (or marking as zero in metadata) all weights that fall below some threshold or ranking, and preventing them from being updated through backpropagation. In one embodiment, in between pruning steps, training may continue the remaining network weights via back-propagation, but using distillation loss (e.g. loss generated at least in part from the non-sparse version of the NN), as opposed to regular cross-entropy loss (e.g. loss generated from an output categorization). The distillation loss may be expressed with respect to, or defined by, the initial, fully-trained version of the network, which acts as the teacher model.

A second phase may include boosting. Boosting may always be used following sparsification, or may be used if the network experiences accuracy loss, or accuracy loss beyond a certain amount, with respect to its dense variant (e.g. the original NN) at the end of the first phase. In a boosting phase, network component or weight spilling steps, in which NN components such as weights which were pruned away at by the end of the distilled pruning phase may be added back to the network, may be alternated with optimization as part of backpropagation. This optimization step may also be performed using distillation loss with the original network as the teacher. Such a process may complete or end for example once the accuracy of the original network has been recovered or surpassed, when accuracy of the sparse network is sufficiently close to the accuracy of the original, dense NN, or based on some other factor.

NN components such as neurons or weights may be chosen to be added back in a number of ways. For example, during each period a random selection of pruned components may be added back; or a certain number of NN components ranked by magnitude (e.g. the X lowest by magnitude) may be added back.

Metadata or a data structure may be used to keep track, for the sparse NN, which components are pruned and which are still active, and also the value of the pruned component. When a NN component is added back—e.g. its status is changed from pruned to active—its original or last known value may be used, or a fixed or random value may be used. Typically, additional training occurs after an element or group of elements is added back.

A distilled pruning phase may start from a fully-trained dense variant of the network, and parameters or user input, such as a desired target sparsity ratio for each layer (some layers may not be sparsified). One embodiment may achieve this target sparsity ratio by alternating two types of training iterations.

A first type of training iteration may perform a threshold-based pruning step at the beginning of the iteration, in which a subset of the weights or other elements may be thresholded and removed from the network (e.g. if they fall below a certain threshold), typically for the rest of the distilled pruning phase. Following this weight thresholding operation, standard training of the weights may occur via backpropagation, but using distilled training including input from a teacher NN.

A second type of training iteration may include performing regular training without first pruning, using standard backpropagation with respect to distillation loss.

For example, distilled training using information from a teacher NN may be used to train a student NN over a series, such as 100,000, iterations. On the 10,000$^{th}$ iteration and each multiple of the 10,000$^{th}$ iteration, pruning may take place on the student NN prior to training using the teacher.

Using distilled training based on a teacher typically involves both the teacher NN and the student NN receiving or processing the same input or example, such that the teacher NN output used to train the student for an example is relevant to the student NN output. In one embodiment, a teacher's output or loss for each of a number of different inputs may be recorded or saved, such that a teacher NN does not have to be executed repeatedly for the same input. Typically, distilled training takes place more frequently than pruning, such that more distilled training without pruning iterations take place than distilled training with pruning iterations. Alternating between pruning and regular training, or interleaving the two processes, typically over a series of repetitions or iterations, may stop when the target sparsity ratio has been attained, or based on another measure.

At that point, a sequence of regular training iterations may take place (e.g. using distilled training, but without pruning), whose goal is to converge to a stable variant of the network. This final variant of the NN and its classification accuracy may be returned. Typically, across epochs and iterations, the same set of training data is used.

In one embodiment, the NN element removed is a link or link weight. In such a case, if a neuron includes multiple input and output links, only one of those links is removed or "zeroed" at a time, without removing other links due to the removal of the first link. This may involve simply removing or zeroing a single entry in a matrix. For example links (e.g. within a layer) are ranked by their magnitudes (e.g. absolute values) which may provide an ordering for removal. For example, the X links with the lowest weights may be removed on an iteration.

In some embodiments, the neural network element removed is a link, and all links may be removed relative to (e.g. incoming to and outgoing from) one neuron, such that it can be considered that a neuron is being removed; this may be termed structured pruning. For example, in one embodiment, neurons (e.g. within a layer) are ranked by the magnitude of the sum of the weights providing signals into each neuron, and for each neuron to be removed, each weight into and out of the neuron is removed.

Typically in a NN, setting a link weight to 0 or removing a link means that the link does not transmit information, and thus if the link goes from neuron A to neuron B, neuron A's activity will no longer reach neuron B. In some NN structures, links connecting two layers are "attached to", mathematically, one layer of the NN.

Pruning may be done on a layer-by-layer basis, e.g. deciding which elements to prune is done separately for each layer.

An example procedure for distilled pruning is provided below in Table 1; other series of operations may be used. While in the example procedure below the NN element to be pruned is link weights, other NN elements may be pruned:

TABLE 1

1. Let the original NN denoted "N" be the trained (e.g. fully-trained), dense variant of the NN which is to be sparsified, and let $S_L$ (e.g. where S is in the range of 0-1, or 0-100%, or another range) be the target sparsity threshold for each layer L (a different sparsity threshold may be used for each layer).
2. Let P be a fixed number of pruning steps to be performed to reach the target sparsity ratio.
3. Initially, the set of pruned weights Pruned$_L$ in each layer L is empty.
4. For each training step t, e.g. over a series of iterations or training steps:
    a. If training step t is a pruning or sparsification step p (e.g. a process may iterate over a series of Y training steps t, where each Y/Pth training step is also a pruning step, such that p is a multiple of X), then for each layer L being sparsified do:

TABLE 1-continued i. Compute the current target sparsity threshold $S_{p,L}$ (e.g. the percentage or threshold of sparse weights desired) for layer L at step p. Various ways of increasing the sparsity threshold may be used. A linear method may not be desired. One example polynomial schedule formula is the following, where $S_L$ is the target or end percentage sparsity:

$$S_{p,L} = S_L\left(1 - \left(1 - \frac{p}{P}\right)^3\right).$$

ii. $\text{Threshold}_p$ = #Parameters * $S_{p,L}$ − #Pruned$_L$; where #Parameters is the number of parameters in the layer, used to rescale $S_{p,L}$. Where $\text{Threshold}_p$ is the number of extra weights which should be thresholded in this step to reach the threshold $S_{p,L}$.
iii. Valid$_L$ = weights in layer L which are not in Pruned$_L$.
iv. Sort the weights in Valid$_L$ by absolute value, in decreasing order, resolving ties or equal weights arbitrarily.
v. Remove the bottom $\text{Threshold}_p$ elements (e.g. weights, or weight groups grouped by attachment to neurons) from Valid$_L$, and add them to Pruned$_L$. A bit mask, or another data entry, may represent Pruned$_L$, e.g. to remove an element its entry may be set to 0.
vi. Weights in Pruned$_L$ have value 0 for the forward network pass and are not updated as part of the backward pass.
b. Perform optimization of the un-pruned network weights via backpropagation
i. Use distillation loss from the teacher network as the optimization target for each example (e.g. input) ex (typically, the teacher's output for a specific input example ex is used to train a student NN on that same ex). This may be performed using a formula such as for example:

$$\text{loss(ex)} = w_D \sum_{i=1}^{K} \log q_i(\text{ex})t_i(\text{ex}) + w_G \sum_{i=1}^{K} \log q_i(\text{ex})d_i(\text{ex}),$$

where $w_D$ and $w_G$ are scalar weights assigned to the two losses, summing to 1, $d_i$ is the ground-truth distribution and $t_i$ is the logit distribution of the original (e.g. teacher) network N. For example, backpropagation on S is performed using, at least in part, loss from N.

Figure 2:
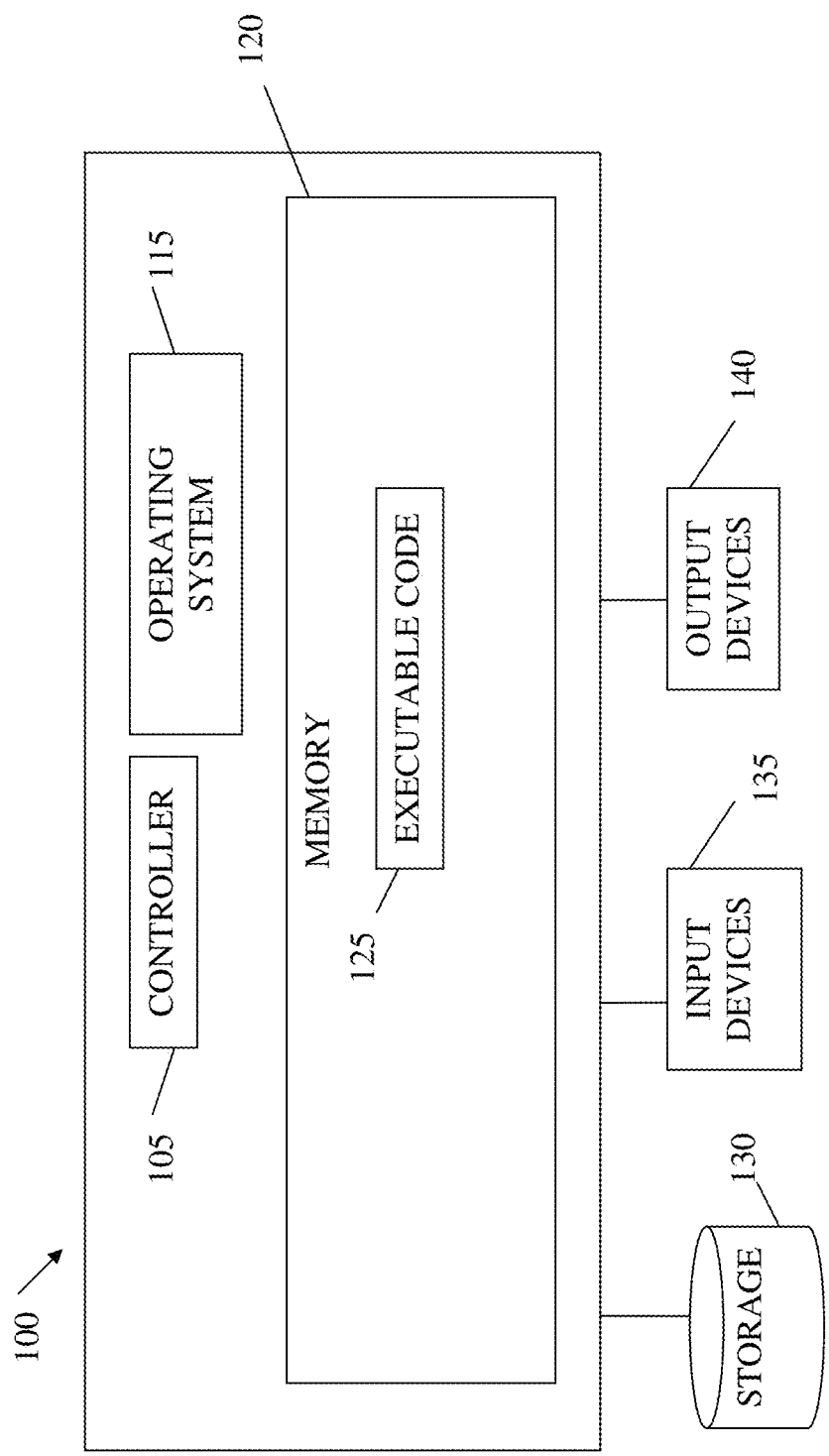
FIG. 2 is a high-level block diagram of an exemplary computing device which may be used with embodiments of the present invention.

Removing or sparsification and training or optimization operations may be performed over a series of iterations or repetitions. Typically the operations of Table 1 are performed by a computer or server such as shown in FIG. 2.

A table, matrix, or mask may be used to determine for each NN element (e.g. weight) if it is pruned or active, and in addition the value of the NN element at the point at which it was pruned in case the element is added back to the NN.

A weight spilling or boosting phase may occur after a pruning phase: while two phases with certain characteristics are described herein, in some embodiments, one of the phases need not be used and the other may be used independently of the other. For example, conventional prior art pruning may be used before a boosting phase. A weight spilling or boosting phase may start with a trained and non-sparse NN (e.g. denoted N) and a sparsified version of N (e.g. denoted S, where S is a product of pruning or distilled pruning such that analogous weights may differ from N to S). For example, such a phase may start from a pruned version of the network (e.g. a copy of the dense NN, but with pruned weights), whose accuracy does not match (or does not match within a threshold) that of the original dense network, and may add back NN elements such as neurons or weights to the network, in order to recover its original accuracy. The elements to be re-introduced may be chosen randomly, or by a non-random scheme, from the reservoir of pruned weights for each layer Pruned$_L$. The value for the re-introduced element may be the last known value, a random value, a zero value, or another value. One example procedure for boosting or spilling is as shown in Table 2 below:

TABLE 2

1. Let the initial network S be the sparsified variant or copy of the NN whose accuracy is to be recovered or improved. S may be created or obtained at the end of a distilled pruning phase or based on any suitable pruning procedure.
2. Let $s_L$ be the initial sparsity level for each layer L of S, and let r be a preset fraction of elements (e.g. weights, such as previously removed weights or other previously removed elements) desired to be re-introduced into the NN S at each step. Notice in one embodiment that $s_L$ = #Pruned$_L$.
3. For each training step t:
a. If t is an element (e.g. weight) re-introduction step, as opposed to a training-only step, then for each layer L do: // many training iterations are performed, and every Nth iteration perform reintroduction
i. Select a fraction r of elements or weights from Pruned$_L$ for example at random or by another method (e.g. ranking, biased random selection, etc.).

TABLE 2-continued ii. Re-introduce the elements or weights into the network by removing them from Pruned$_L$ (e.g. altering a mask or other data structure). Their starting value could be for example the last known weight, zero, a random number, or another value iii. The weights in Pruned$_L$ resume being optimized as part of the back-propagation process, based on their starting value chosen below.

b. Perform optimization or training of the network weights via backpropagation i. Use distillation loss from the dense or teacher NN N as the optimization target for each, e.g. using outputs from N, using example ex (typically, the teacher's output for a specific input example ex is used to train a student NN using that same ex). For example:

$$\text{loss(ex)} = w_D \sum_{i=1}^{K} \log q_i(\text{ex}) t_i(\text{ex}) + w_G \sum_{i=1}^{K} \log q_i(\text{ex}) d_i(\text{ex}),$$

where d$_i$ is the ground-truth distribution and t$_i$ is the logit distribution of the original network N. For example, backpropagation on S is performed using, at least in part, loss from N.

c. Measure the train, test or validation accuracy of the network and return if the original train or test accuracy has been recovered.

---

Re-introduction and optimization may be performed over a series of iterations or repetitions. Typically the operations of Table 2 are performed by a computer or server such as shown in FIG. 2.

An embodiment may create or obtain a sparse variant of a dense or original NN with a similar accuracy to the dense original variant of the NN. Accuracy may be measured or defined by for example the percentage of outputs or answers from the NN which match the ground truth (e.g. the correct answer) on a test fraction of the input (e.g. a test set). Other measures of accuracy may be used. In one embodiment an acceptable similar accuracy of a sparsified NN is an accuracy within 1% of that of the original NN; other measures or definitions of "similar" may be used.

As discussed, the sparse NN may be created by training the network with respect (at least in part) to the loss of the dense original network. The loss used for training may be a combination of the original dense network loss and the new sparsified network's loss, typically for the same example or input. Previously pruned weights may be iteratively or repeatedly re-introduced into the training process.

The algorithms and methods described above are now elaborated on with respect to the systems of FIGS. 1 and 2; however other specific systems may be used.

FIG. 1 is a simplified block diagram of a NN which may be operated on or computed according to an embodiment of the present invention; in typical use thousands of neurons and links are used. In one embodiment software or code generated simulates the operation (e.g. inference) of NN 1000, as is known. NN 1000 may input data as for example an input vector or example 1010 of values (representing, e.g. a photograph, voice recording, or any sort of data), and may produce an output of signals or values, for example output vector 1020. NN 1000 may have neurons arranged into layers 1030, each including neurons 1040 connected to other neurons by links or edges 1050. NN 1000 may input data, for example an image (e.g. an input vector, matrix or other data) and may produce an output of signals or values, for example output vector 1020, which may for example indicate the content of or a description of the image. Other input data may be analyzed. NN 1000 may in one example have layers such as convolution, pooling, output layers, an FC layer, a softmax layer, etc. Each layer may include neurons connected to other neurons by links or edges. The NN in FIG. 1 is typically simulated, and represented as data, for example by systems such as shown in FIG. 2. While specific numbers and types of layers are shown, FIG. 1 is merely a highly generalized example, and NNs used with embodiments of the present invention may vary widely as known in the art.

A softmax layer may be the output layer of a neural network, using a softmax activation function, a generalization of the logistic function. A softmax function may take as input a vector of K real numbers, and normalize it into a probability distribution consisting of K probabilities proportional to the exponentials of the input numbers. A softmax layer may map the non-normalized output of a NN to a probability distribution over predicted output classes.

FIG. 2 shows a high-level block diagram of an exemplary computing device which may be used with embodiments of the present invention. Computing device 100 may include a controller or processor 105 that may be or include, for example, one or more central processing unit processor(s) (CPU), one or more Graphics Processing Unit(s) (GPU or GPGPU), a chip or any suitable computing or computational device, an operating system 115, a memory 120, a storage 130, input devices 135 and output devices 140. Modules or equipment training or executing a NN may be or include, or may be executed by, a computing device such as included in FIG. 2.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SDRAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may store for example, instructions to carry out a method (e.g. code 125), and/or data such as user responses, interruptions, etc.

Executable code 125 may be any executable code, e.g., an application, a program, a process, task or script. Executable code 125 may be executed by controller 105 possibly under control of operating system 115. For example, executable code 125 may when executed cause the training of a NN or NN execution or inference, according to embodiments of the present invention. In some embodiments, more than one computing device 100 or components of device 100 may be used for multiple functions described herein. For the various modules and functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the present invention by for example executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, NN model data, parameters, etc. may be stored in a storage 130 and may be loaded from storage 130 into a memory 120 where it may be processed by controller 105. In some embodiments, some of the components shown in FIG. 2 may be omitted.

Input devices 135 may be or may include for example a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Figure 4:
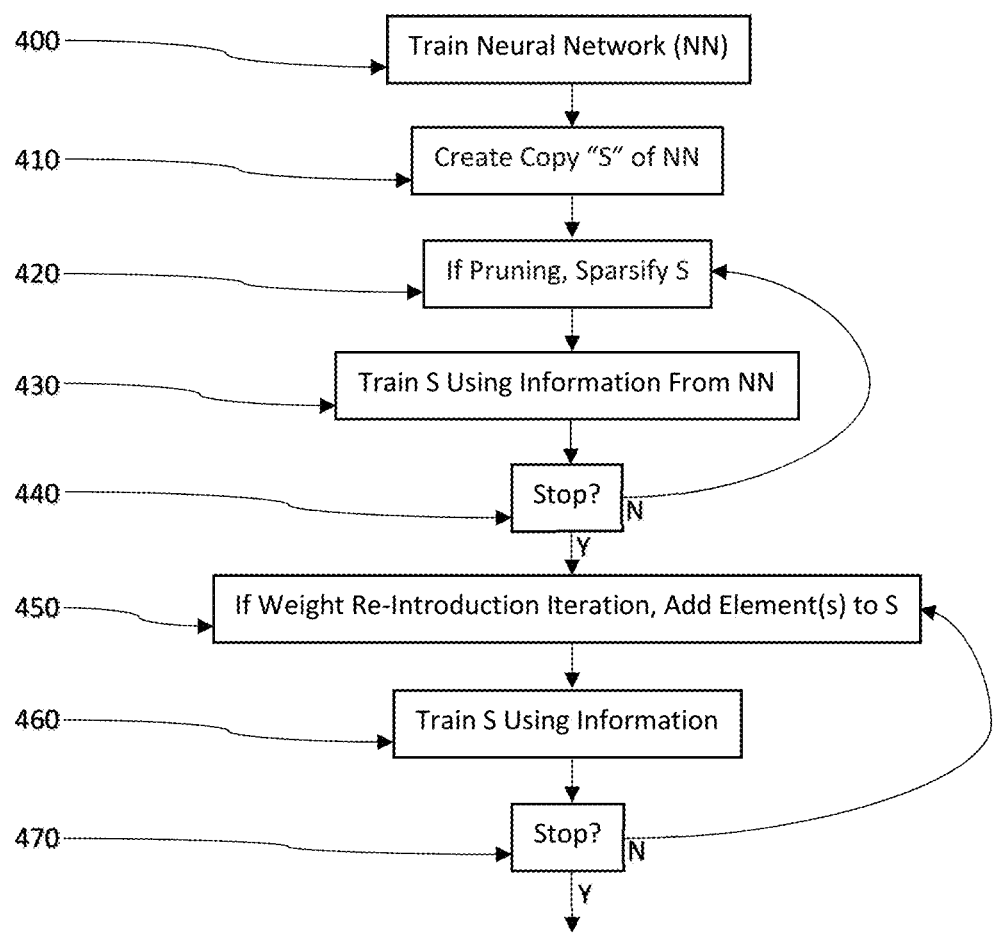
FIG. 4 is a flowchart of a method according to embodiments of the present invention.

FIG. 4 is a flowchart of a method for training a NN according to embodiments of the present invention. While in one embodiment the operations of FIG. 4 are carried out using systems as shown in FIGS. 1 and 2, in other embodiments other systems and equipment can be used. In some embodiments, only certain portions of the operations of FIG. 4 may be used; for example a set of operations for pruning may be performed without operations reincorporating or reintroducing NN elements back into a NN, and vice versa.

In operation 400 a NN may be trained according to known methods. This NN may be referred to as a dense variant, or a "teacher" NN.

In operation 410 a copy (denoted "S" for the purpose of this example flowchart) of the "teacher" NN created in operation 400 may be created.

A pruning-training set of iterations or cycles may commence on S with operation 420.

In operation 420, if the iteration is a pruning iteration or repetition, S may be sparsified, e.g. S may have elements (e.g. links, link weights, neurons) removed or pruned. This may create a sparsified version of S, or further sparsify an already sparsified S. In one embodiment, a certain number, amount, proportion or percentage of elements may be removed. A certain set, number, amount, etc. of elements may be removed for each division of the NN, e.g. for each of a certain set of layers (some layers may not be pruned). Such removal may be done on a layer-by layer basis, or only for certain layers. For each pruning iteration, additional elements may be removed (additional to previously removed elements).

In operation 430, optimization or training may be performed on the pruned NN S, using information from the teacher NN, for example using loss or outputs from the teacher NN. For example, a distillation loss from the teacher NN (possibly in combination with other information) created in operation 400, for a certain input, may be used to train NN S. In one embodiment, the same input or example is applied to both a teacher NN and the student NN S, and the teacher's loss for that input is used to train the student.

In operation 440, stopping may occur, or another iteration may occur, depending on conditions and different embodiments. For example, if accuracy compared to the non-sparse teacher NN, or accuracy close to a threshold, has not been recovered, or a certain number of iterations have not yet taken place, another iteration may occur: for example processing may continue at operation 420. If appropriate accuracy has been recovered, or a certain number of iterations have taken place, processing may end, or may continue to operation 450.

A re-introduction or boosting phase may begin with operation 450. If the pruning phase as described herein is not performed before boosting, another process may have created a trained and non-sparse network (e.g. a "teacher") and a sparsified or pruned network (e.g. a "student" or "S") which is typically a copy or derivation of the teacher NN.

In operation 450, if the iteration is an element or weight re-introduction iteration or repetition, S may have elements added or re-introduced. Typically the re-introduced elements are those previously removed from S The elements re-introduced may be those pruned or removed during a pruning or sparsification phase. The value(s) of the element when reintroduced may be for example the last known weight, zero, a random number, or another value. Re-introduction during each iteration may be performed by section of the NN, e.g. by layer.

In operation 460 training may be performed on the NN S using (at least in part) information from the teacher. The information used to train S may be for example outputs from the non-sparse teacher NN, loss, or distillation loss. In one embodiment, the same input or example is applied to both a teacher NN and the student NN S, and the teacher's loss for that input is used to train the student.

In operation 470, stopping may occur, or another iteration may occur, depending on conditions and different embodiments. For example, the reintroduction iteration may stop if a condition is met, for example a target accuracy (e.g. that of the teacher NN, or within a certain percentage of teacher NN accuracy) has been reached or a number of iterations has been reached; if not re-introduction may continue with operation 450.

Other or different operations may be used.

Embodiments of the present invention may improve upon prior NN performance by for example improving the accuracy of pruned NNs. Pruned NNs may be more efficient to store and execute, but may have reduced accuracy: embodiments of the present invention may produce pruned NNs with accuracy comparable to or equal to non-pruned NNs.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for training a neural network (NN), the method comprising:
    training a NN N; and
    for S, a version of N to be sparsified:
        removing NN elements from S to create a sparsified version of S; and
        training S using outputs from N.
2. The method of claim 1 wherein the outputs from N comprise the outputs of a softmax layer.
3. The method of claim 1 wherein the NN elements comprise links.
4. The method of claim 1 comprising performing the removing and training operations over a series of iterations.
5. The method of claim 1 comprising training S using, for an input, outputs from N based on that input and the ground truth for that input.
6. The method of claim 1 comprising re-introducing NN elements previously removed from S, and training S using outputs from N.
7. The method of claim 1, comprising training S using a loss generated from outputs from N.
8. A method for training a neural network (NN), the method comprising:
    for a trained NN N and S, a sparsified version of N:
        re-introducing NN elements previously removed from S; and
        training S using outputs from N.
9. The method of claim 8 wherein the outputs from N comprise the outputs of a softmax layer.
10. The method of claim 8 wherein the NN elements comprise links.
11. The method of claim 8 comprising performing the re-introducing and training operations over a series of iterations.
12. The method of claim 8 comprising training S using, for an input, outputs from N based on that input and the ground truth for that input.
13. The method of claim 8 wherein S is sparsified by training S using outputs from N.
14. The method of claim 8, comprising training S using a loss generated from outputs from N.
15. A system for training a neural network (NN), the system comprising:
    a memory, and
    a processor configured to:
        train a NN N; and
        for S, a version of N to be sparsified:
            remove NN elements from S to create a sparsified version of S; and
            train S using outputs from N.
16. The system of claim 15 wherein the outputs from N comprise the outputs of a softmax layer.
17. The system of claim 15 wherein the NN elements comprise links.
18. The system of claim 15 wherein the processor is configured to perform the removing and training operations over a series of iterations.
19. The system of claim 15 wherein the processor is configured to train S using, for an input, outputs from N based on that input and the ground truth for that input.
20. The system of claim 15 wherein the processor is configured to re-introduce NN elements previously removed from S, and training S using outputs from N.
21. The system of claim 15, wherein the processor is configured to train S using a loss generated from outputs from N.
22. A system for training a neural network (NN), the system comprising:
    a memory, and
    a processor configured to:
        for a trained NN N and S, a sparsified version of N:
            re-introduce NN elements previously removed from S; and
            train S using outputs from N.
23. The system of claim 22 wherein the outputs from N comprise the outputs of a softmax layer.
24. The system of claim 22 wherein the NN elements comprise links.
25. The system of claim 22 wherein the processor is configured to perform the re-introducing and training operations over a series of iterations.
26. The system of claim 22 wherein the processor is configured to train S using, for an input, outputs from N based on that input and the ground truth for that input.
27. The system of claim 22 wherein S is sparsified by training S using outputs from N.
28. The system of claim 22, wherein the processor is configured to train S using a loss generated from outputs from N.

* * * * *